Oct. 4, 1932.　　T. E. MURRAY　　1,880,269
HOLLOW FITTING
Filed July 6, 1928　　2 Sheets-Sheet 2
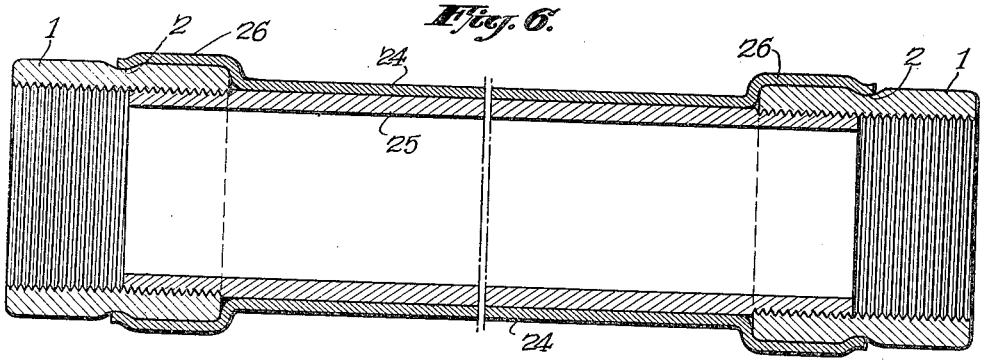
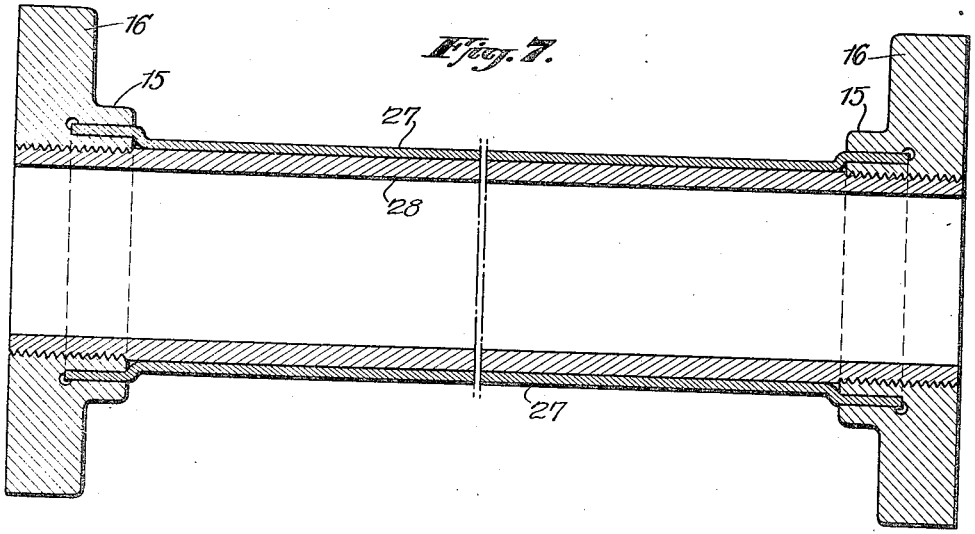
Inventor
THOMAS E. MURRAY.
By His Attorney Patented Oct. 4, 1932

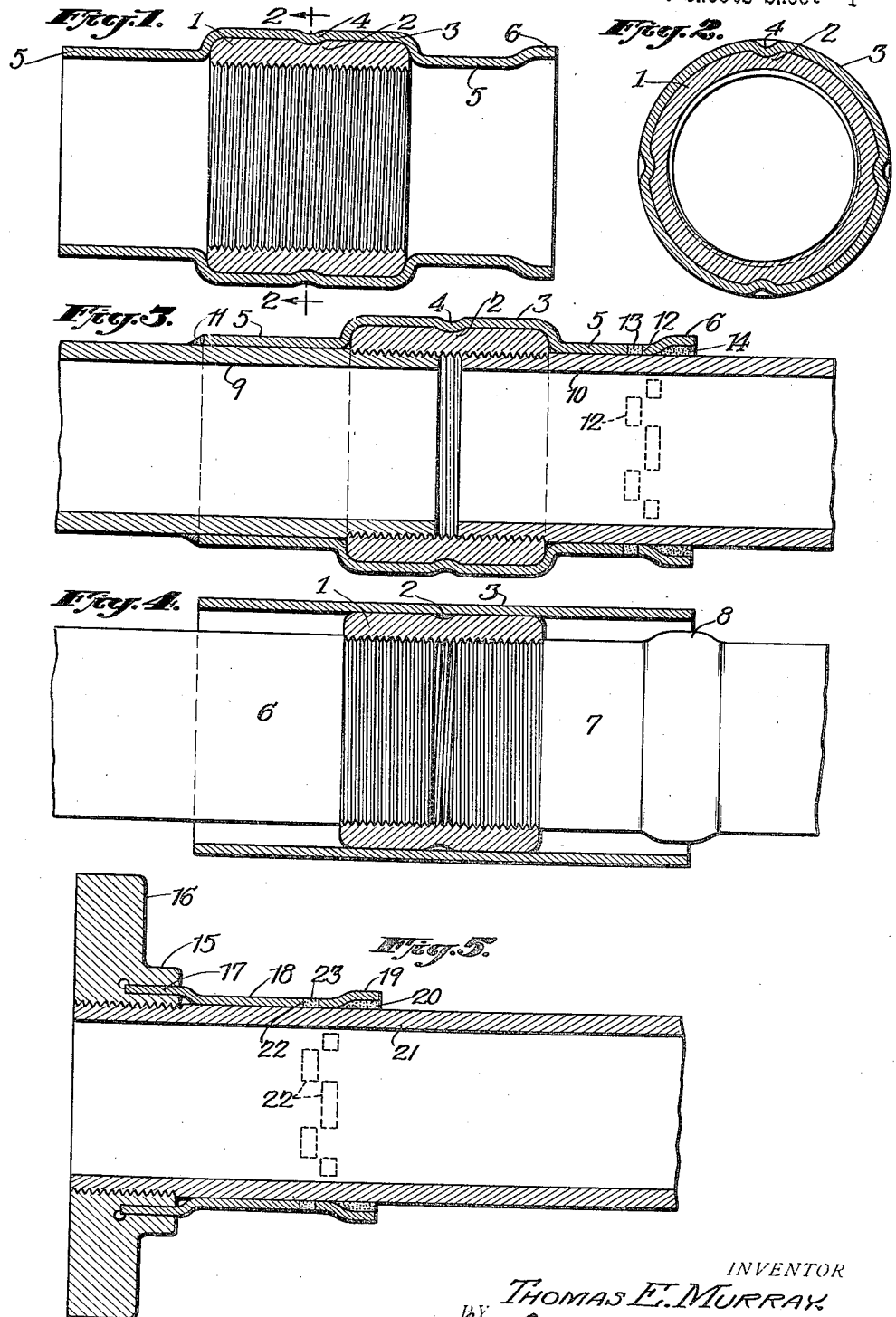

1,880,269

UNITED STATES PATENT OFFICE

THOMAS E. MURRAY, OF BROOKLYN, NEW YORK; JOSEPH BRADLEY MURRAY, THOMAS E. MURRAY, JR., AND JOHN F. MURRAY, EXECUTORS OF SAID THOMAS E. MURRAY, DECEASED, ASSIGNORS TO METROPOLITAN ENGINEERING COMPANY, A CORPORATION OF NEW YORK

HOLLOW FITTING

Application filed July 6, 1928. Serial No. 290,851.

The invention aims to provide a pipe fitting adapted to be easily and correctly screwed on a pipe and having certain other advantages referred to hereinafter in detail.

Fig. 1 is a longitudinal section of a fitting.

Fig. 2 is a cross-section of the same on the line 2—2 of Fig. 1.

Fig. 3 is a view similar to Fig. 1 showing the fitting in use.

Fig. 4 is a similar section showing how the fitting is made.

Fig. 5 shows another style of fitting embodying the invention.

Figs. 6 and 7 are sections similar to Figs. 3 and 5 illustrating other embodiments of the invention.

Referring to Figs. 1 to 4, 1 is a standard pipe coupling formed with recesses 2 or similar irregularities at intervals around it. Such couplings are generally made comparatively heavy and screw threaded internally. On the outside of this, a comparatively thin walled tube 3 is placed extending a considerable distance beyond the ends of the coupling and pressed into the recesses 2 to form projections 4 which lock it to the coupling. Beyond the coupling 1 the thin tube is reduced in diameter to form extension 5 fitting the outer diameter of pipes which are to be coupled and thus serving as elongated guides to hold the coupling in line with the pipe when it is to be screwed thereon. At one, or it may be at both, ends the extension is formed with a bell 6 to allow for the introduction of calking between the fitting and the pipe.

The method of production of the improved fitting is indicated in Fig. 4. The guide tube is made to fit the outside of the coupling 1 and is placed thereon in the proper location to get the necessary length of extension beyond each end of the coupling. The central portion of the guide is then pressed into recesses 2 in the manner shown in Fig. 1. This is chiefly to hold the guide and the coupling together in subsequent operations. Various other ways of locking the two together may be used. Or they may be welded or soldered together. In fact they may be fitted so closely together that friction will hold them during the subsequent operations.

A mandrel or mandrels are then inserted into the coupling. Fig. 4 shows a straight cylindrical mandrel 6 at one end and a mandrel 7 at the other end having an enlarged portion 8 for forming a bell end 6. The guide tube is swaged or spun or otherwise reduced to fit the mandrels, whereupon the latter are withdrawn, leaving the fitting as shown in Fig. 1.

Fig. 3 shows the fitting in use. Pipe sections 9 and 10 are screwed into the opposite ends, the guides 5 making it easy to hold the pipe and the fitting in line while making a connection. This avoids the crossing of the threads in the beginning and saves strain on the threads during the coupling operation and afterwards.

The fitting has another advantage, particularly in piping which is to be used under high pressure. In that case the guide and the pipe can be welded together at a point so remote from the coupling as to avoid injuring or distorting the latter by the heat of the welding operation. In Fig. 3, at the left I show a weld made of deposited metal 11, as by arc welding, at the end of the guide 5. At the right hand end I show an alternative method. The guide is provided with slots 12 through it and extending around its circumference in staggered positions. These slots are filled with deposited welded metal 13.

The bell ends leave a space around the pipe which may be filled with calking materials 14. The two ends of the guide tube may be different as in Fig. 4, particularly where the pipes 9 and 10 are of different sorts. Or the design and arrangement shown at either end may be duplicated at the other end. The recesses in the bell 6 may be used for the introduction of welding metal. Or where recesses 12 are provided in addition, these may be used for the welding metal so as to make a metallic connection which takes some of the tensile strength of the joint, and may be supplemented by calking of any usual or suitable character in the bell.

The invention is applicable to other fittings than the straight coupling above described. For example in Fig. 5 I show it applied to a tubular fitting 15 having a flange 16. It may be equally well fitted to a T, angle, bend or the like. The end 17 of the guide is forced into a recess in the fitting and welded, brazed or otherwise united thereto. The extension 18 is then formed by a mandrel screwed into the fitting 15 in a manner similar to that shown in Fig. 4. The portion 18 may extend straight to the free end or it may be belled as at 19 to allow for calking 20 about the pipe 21. And it may be provided with slots 22 for welding metal 23 or not according to the intended use. Instead of welding through the slots 22, these can be omitted and welding metal deposited in the end of the guide sufficiently belled for this purpose.

The guide is preferably made of thin steel suitable for working into the shapes desired, and adds very little to the weight or cost of the complete fitting.

The steel tube closely surrounding the coupling or similar fitting serves to strengthen the latter, particularly where the fitting is made of cast metal or other metal of comparatively low tensile strength. For example a fitting of copper or brass may be used where without the surrounding tube such metal would not have the desired strength.

The guide tube may also extend over the entire length of the pipe section, as shown in Figs. 6 and 7. In that case the outer tube of steel or other ferrous metal contributes such tensile strength that the pipe as well as the fitting may be of softer or weaker metal such as lead, copper, brass or cast steel or iron.

In Fig. 6 a thin steel guide tube 24, similar to the tube 5 of Fig. 3 extends from one coupling to the next being fastened thereon by pressing it into recesses 2 or in the other ways referred to above. It thus guides and protects the entire length of the pipe 25 which is screwed at its opposite ends into the couplings 1. In making up such a structure, the guide tube 24 is mounted on one of the couplings and the pipe 25 screwed into that coupling. The guide tube facilitates the making of this connection and strengthens it and saves strain on the threads afterwards. The opposite ends of the tube are enlarged as at 26. The second coupling can therefore be screwed on to the free end of the pipe 25 and the tube afterwards locked into engagement with the recesses 2 of the coupling.

Similarly for the flanged fitting 15 of Fig. 7, a thin steel guide tube 27 is arranged to extend over the entire length of the pipe 28 between two similar fittings (or they may be dissimilar). The tube 27 is united to the fittings in the same way as in Fig. 5. One fitting is united on the end of the tubular guide and the pipe 28 screwed into place; after which the fitting at the other end is screwed on to the pipe and united to the guide tube. The tubular guide is not necessarily placed around the entire length of the fitting though it should for maximum strength closely surround the portion of the fitting with which the pipe is intended to engage.

Various other modifications may be made by those skilled in the art without departing from the invention as defined in the following claims.

What I claim is:

1. In a pipe joint comprising a coupling and pipe ends threaded therein, means to seal the joint comprising a sleeve member disposed around the coupling and extending beyond the ends thereof about the pipe, the ends of the sleeve being welded to the pipe at a point remote from the coupling.

2. In a pipe joint comprising a coupling and pipe ends threaded therein, means to seal the joint comprising a sleeve member disposed around the coupling and extending a substantial distance along the pipe beyond the coupling, the ends of the sleeve being welded to the outer periphery of the pipe to form an hermetic seal therewith.

3. In a pipe joint comprising a coupling and pipe ends threaded therein, means to seal the joint comprising a sleeve member disposed about the coupling and extending beyond the ends thereof, the said sleeve extensions being adapted to engage the outer periphery of the pipe for a substantial distance from the said coupling and to be welded thereto at a point remote from the coupling and means to hermetically seal the extreme ends of the extension to the outer periphery of the pipe.

In witness whereof, I have hereunto signed my name.

THOMAS E. MURRAY.